United States Patent
Godefroy et al.

(10) Patent No.: US 9,373,989 B2
(45) Date of Patent: Jun. 21, 2016

(54) ONE-PIECE VOLTAGE REGULATOR/BRUSH-HOLDER ASSEMBLY FOR A ROTARY ELECTRICAL MACHINE AND ROTARY ELECTRICAL MACHINE INCLUDING SUCH AN ASSEMBLY

(75) Inventors: Gregory Godefroy, Saint Maur des Fosses (FR); Pierre Tisserand, Limeil Brevannes (FR); Christophe Dugue, Palaiseau (FR); Khalid Sassane, Champigny sur Mar (FR)

(73) Assignee: Valeo Equipements Electriques Moteur (FR)

( * ) Notice: Subject to any disclaimer, the term of this patent is extended or adjusted under 35 U.S.C. 154(b) by 542 days.

(21) Appl. No.: 13/884,776

(22) PCT Filed: Nov. 10, 2011

(86) PCT No.: PCT/FR2011/052614
§ 371 (c)(1),
(2), (4) Date: Sep. 4, 2013

(87) PCT Pub. No.: WO2012/069726
PCT Pub. Date: May 31, 2012

(65) Prior Publication Data
US 2013/0334935 A1  Dec. 19, 2013

(30) Foreign Application Priority Data
Nov. 22, 2010 (FR) ...................................... 10 59570

(51) Int. Cl.
*H02K 9/28* (2006.01)
*H02P 9/14* (2006.01)
*H01R 39/38* (2006.01)

(52) U.S. Cl.
CPC .................. *H02K 9/28* (2013.01); *H01R 39/38* (2013.01); *H02P 9/14* (2013.01)

(58) Field of Classification Search
CPC ..................................... H02K 9/28; H02P 9/14
USPC ................................................. 310/68 B, 239
See application file for complete search history.

(56) References Cited

U.S. PATENT DOCUMENTS

2004/0080231 A1  4/2004  You
2004/0169783 A1 *  9/2004  Miyashita ......... G02F 1/133308
                                                         349/58

(Continued)

FOREIGN PATENT DOCUMENTS

DE   10 2007 001218   12/2007
FR   2886781          12/2006
GB   2456679          7/2009

*Primary Examiner* — Terrance Kenerly
(74) *Attorney, Agent, or Firm* — Berenato & White, LLC

(57) ABSTRACT

An electrical machine such as an alternator or starter-alternator for a motor vehicle which is fitted with the one-piece voltage-regulator/brush-holder assembly (1). The brush-holder (6) is capable of guiding at least first and second brushes by means of respective first and second longitudinal recesses (7). The recesses are substantially parallelepiped, made of an electrically insulating material and extend substantially in an axial plane of a rotor of the machine. Each recess is provided with at least one respective longitudinal internal groove (9) in communication with at least one channel (11) provided in a body (6) of the assembly (1), in an axial direction (XX') of the rotor, and intended for a coolant (8) to pass therethrough. A first cross section of the first internal groove is between 5% and 7% of a second cross section of the recesses.

9 Claims, 3 Drawing Sheets

(56) References Cited

U.S. PATENT DOCUMENTS

| | | | | |
|---|---|---|---|---|
| 2006/0208581 A1* | 9/2006 | Ikuta | .................. | H02K 5/18 310/58 |
| 2008/0290763 A1* | 11/2008 | Oohashi | ............... | H02K 19/365 310/68 D |
| 2009/0189478 A1* | 7/2009 | Wada | .................. | H02K 9/28 310/227 |

* cited by examiner

ONE-PIECE VOLTAGE REGULATOR/BRUSH-HOLDER ASSEMBLY FOR A ROTARY ELECTRICAL MACHINE AND ROTARY ELECTRICAL MACHINE INCLUDING SUCH AN ASSEMBLY

CROSS-REFERENCE TO RELATED APPLICATIONS AND CLAIM TO PRIORITY

This application is a national stage application of International Application No. PCT/FR2011/052614 filed Nov. 10, 2011, which claims priority to French Patent Application No. 10/59570 filed Nov. 22, 2010, of which the disclosures are incorporated herein by reference and to which priority is claimed.

TECHNICAL FIELD OF THE INVENTION

The present invention relates to a voltage regulator/brush-holder assembly in a single piece for a rotary electrical machine, and a rotary electrical machine comprising an assembly of this type.

TECHNOLOGICAL BACKGROUND OF THE INVENTION

A motor vehicle is generally equipped with an alternator which is driven by the thermal engine of the vehicle, in order to ensure that the battery is charged, and to produce the electric energy necessary for the on-board electrical network to which the various items of equipment are connected.

The alternator is generally driven by a belt which is engaged on the drive shaft. It is thus implanted in the immediate vicinity of the thermal engine, under the engine bonnet.

Taking into account the development of the thermal engines of vehicles which are increasingly confined, the ambient temperature under the engine bonnet is increasing more and more.

An alternator is a rotary electrical machine which substantially comprises a rotor which is integral in rotation with a shaft which rotates inside a stator which is provided in a housing.

One end of the rotor shaft is provided with collector rings on which the brushes rub, guided by a brush-holder which is supported by the housing, and which rings make it possible to supply an excitation winding of the rotor from the on-board electrical network.

The stator windings produce a voltage which, after being rectified, is regulated by a voltage regulator which controls the excitation current of the rotor.

The same development of vehicles which has led to increased confinement of the thermal engines has led to the need to make the alternators more compact.

For this purpose it is known to integrate the voltage regulator device and the brush-holder in an assembly in a single piece made of electrically insulating material, which is provided on the housing, around the bearing of the rotor shaft, opposite collector rings.

In the confined environment of the engine bonnet, the temperature to which the alternator is subjected in operation can rise to 125° C.

The temperature of the brushes can reach 200° C. because of the friction with the collector rings.

Consequently, an alternator comprises a fan integral with the rotor, which aspirates the relatively cool air obtained from the exterior, in order to cool the interior of the housing.

The high temperature of the brushes causes an increase in their wear, and a decrease in the performance of the alternator.

The Korean patent application KR 20100048703, in the name of the company VALEO ELECTRICAL SYSTEMS KOREA proposes a solution to improve the cooling of one of the brushes of an alternator of a motor vehicle, by making part of the axial flow of air aspirated by the fan circulate in the interior of the brush-holder.

GENERAL DESCRIPTION OF THE INVENTION

The object of the present invention is to optimise and improve the cooling of the brush assembly of an alternator or an alternator-starter for a motor vehicle, this alternator or alternator-starter comprising a voltage regulator/brush-holder assembly in a single piece.

According to a first aspect, the invention concerns a voltage regulator/brush-holder assembly in a single piece comprising a brush-holder of the type which can guide at least one of the first and second brushes, in contact with two collector rings of a rotor of the rotary electrical machine, by means of first and second longitudinal receptacles provided in the direction of these collector rings, in a substantially parallelepiped body made of electrically insulating material which extends substantially on an axial plane of the rotor. Each of these first and second receptacles is provided with at least a first inner longitudinal groove in communication with at least one channel which is provided in the body of the brush-holder, according to an axial direction of the rotor, and is designed to have a cooling fluid such as air passing through it.

According to the invention, the voltage regulator/brush-holder assembly in a single piece which makes it possible to optimise the circulation of this cooling fluid comprises a first straight section of the first inner groove which is contained between 5% and 7% of a second straight section of the receptacles of the brushes.

According to another characteristic of the invention, the first inner grooves corresponding respectively to the first and second longitudinal receptacles have respective first straight sections which are different. These different sections permit different flows of cooling air for each of the first and second receptacles/brushes. In fact, a substantial difference of a few degrees of temperature generally exists between the receptacles/brushes, the receptacle/brush which is closest to the rear bearing of the machine generally having a temperature which is higher than that of the receptacle which is furthest from the rear bearing.

According to yet another characteristic of the invention, each of the first and second receptacles is advantageously provided with at least a second inner longitudinal groove which is or is not in communication with the said channel, and has a third straight section which is smaller than, or equal to, the second straight section.

According to yet another characteristic of the invention, the first straight section is advantageously a first rectangle, the second straight section is preferably globally a second rectangle, the large sides of which each have a part in the form of an arc of a circle, and the third section is highly advantageously a third rectangle.

The voltage regulator/brush-holder assembly in a single piece according to the invention which makes it possible to improve the cooling of the brushes of a rotary electrical machine is also distinguished in that the body of the brush-holder comprises cooling fins parallel to the axial direction of the rotor, which are provided on at least one longitudinal surface.

According to a particular embodiment, these fins have a square or triangular or trapezoidal profile. They are highly advantageously provided on the longitudinal surface of the brush-holder body which is opposite the voltage regulator.

According to another aspect, the invention also concerns a rotary electrical machine which is distinguished in that it comprises a voltage regulator/brush-holder assembly in a single piece which has the preceding optimised and improved characteristics.

These few specifications will have made apparent to persons skilled in the art the advantages provided by the voltage regulator/brush-holder assembly in a single piece according to the invention, at the level of cooling of the brushes, in comparison with the prior art.

The detailed specifications of the invention are given in the description which is provided hereinafter in association with the appended drawings. It should be noted that these drawings serve the purpose only of illustrating the text of the description, and do not constitute in any way a limitation of the scope of the invention.

DESCRIPTION OF A PREFERRED EMBODIMENT OF THE INVENTION

Figure 1:
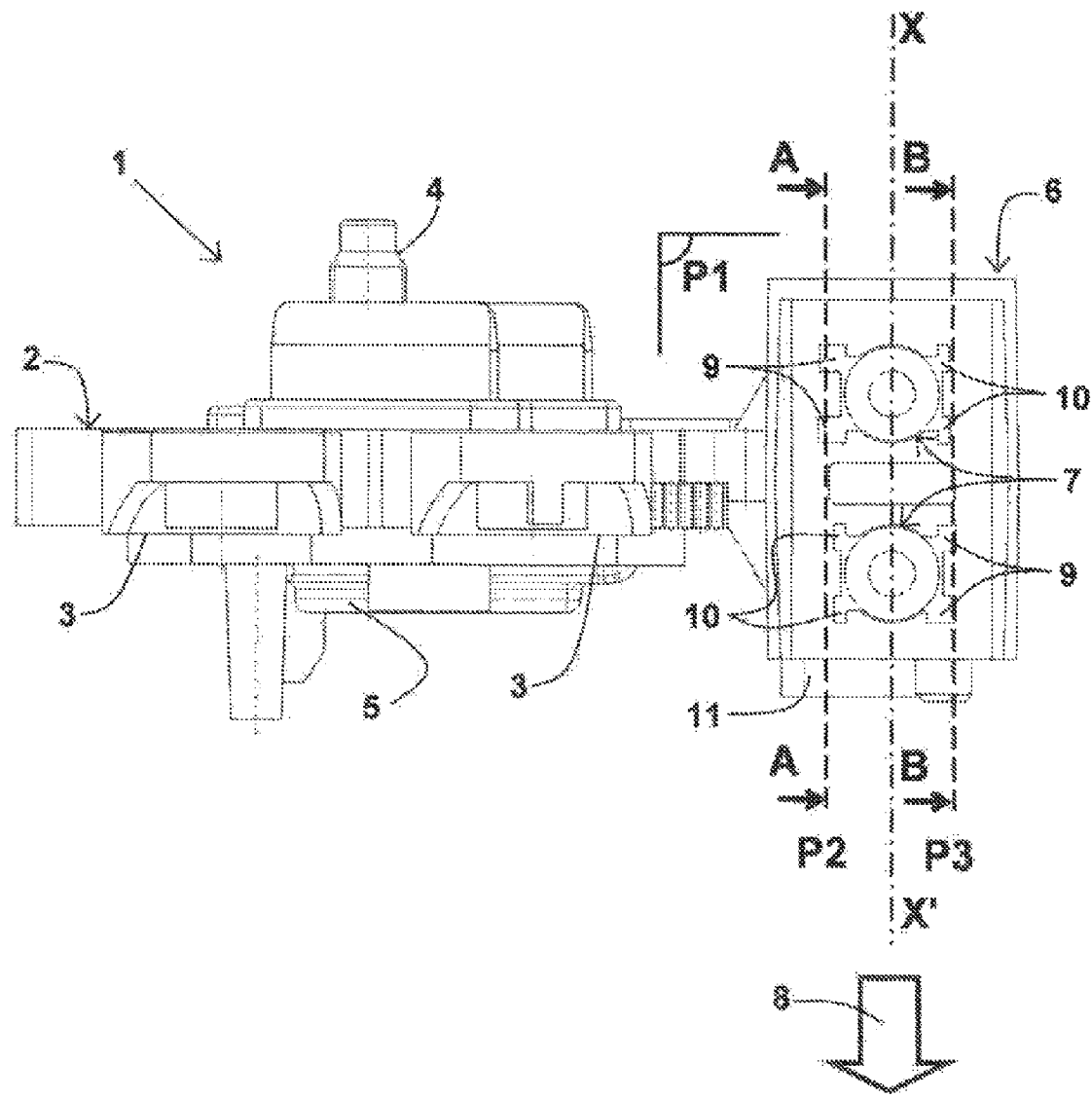
FIG. 1 is a general view of the voltage regulator/brush-holder assembly in a single piece according to the invention, in a radial direction of a rotor of a rotary electrical machine for which it is destined.

FIG. 1 shows the essential elements of a voltage regulator/brush-holder assembly in a single piece 1 which is designed to be secured on the housing of an alternator at the level of the rear bearing of the axis XX' of the rotor;
a plate 2 which supports the electrical terminals 3 for connection of the alternator to the on-board electrical network, and various connectors 4;
a voltage regulator device 5;
a brush-holder 6 comprising receptacles 7 for the brushes.
An internal centrifugal fan (not represented) which is mounted on the rotor shaft aspirates air from the exterior and creates an axial flow of air 8 in the vicinity of the shaft.

Part of this flow of air 8 circulates in the brush-holder 6 by means of the inner grooves 9, 10 with which the receptacles 7 of the brushes are provided, and which are in communication with vents 11 which open as close as possible to the fan.

Figure 2A:
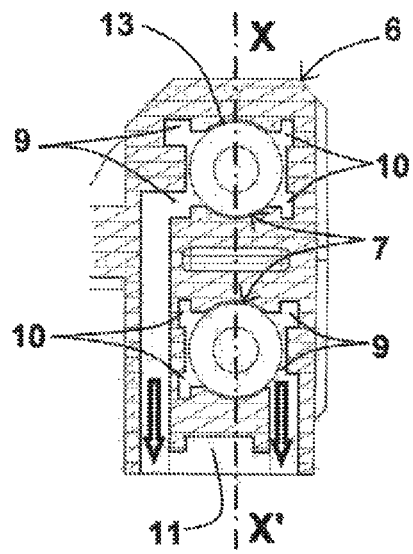
FIG. 2a shows a view in cross-section of the body of the brush-holder according to the invention, on a first plane parallel to the axis of a rotor of a rotary electrical machine for which it is destined, and perpendicular to the longitudinal direction of the receptacles of the brushes.
Figure 2B:
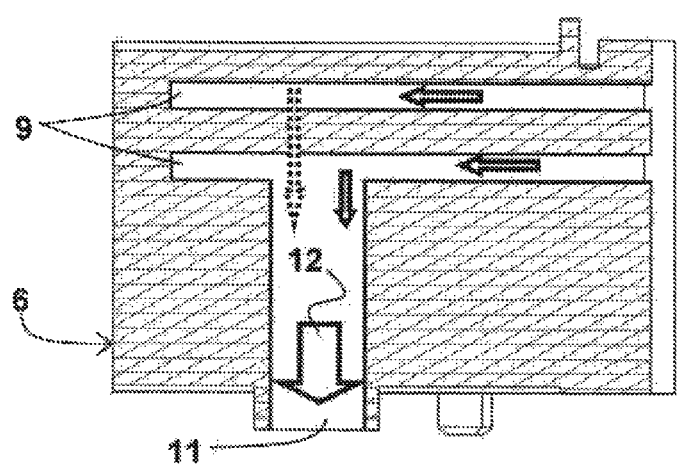
FIG. 2b shows a view in cross-section of the body of the brush-holder according to the invention, on a second plane parallel to the axis of a rotor of a rotary electrical machine for which it is destined, and parallel to the longitudinal direction of the receptacles of the brushes.
Figure 2C:
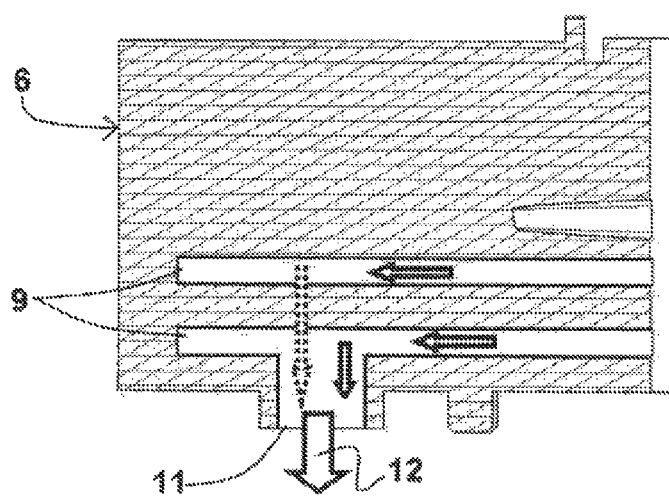
FIG. 2c shows a view in cross-section of the body of the brush-holder according to the invention, on a third plane parallel to the axis of a rotor of a rotary electrical machine for which it is destined, and parallel to the longitudinal direction of the receptacles of the brushes.

FIGS. 2a, 2b and 2c show clearly the arrangement of these grooves 9, 10 and these axial channels 11 inside the substantially parallelepiped body which constitutes the brush-holder 6.

FIG. 2a, which is a view in cross-section of the body of the brush-holder 6 on a first plane P1 parallel to the axis XX' of the rotor shows that there are first inner grooves 9 with a straight section which is relatively large in comparison with a second straight section of the receptacles 7, whereas there are second inner grooves 10 which have a third, smaller straight section.

As shown clearly in FIGS. 2b and 2c, which are respectively views in cross-section A-A and B-B of the body of the brush-holder 6 according to the second and third planes P2, P3 parallel to the axis XX' of the rotor, only the first inner grooves communicate in this preferred embodiment with axial channels 11.

The inventive body has found that the circulation 12 of the air in the brush-holder 6 is optimum when the first straight section represents between 5 and 7% of a second straight section of the receptacles 7 of the brushes.

In this embodiment, the first straight section is a first rectangle with dimensions substantially equal to 2.0 mm×1.8 mm. The second straight section is globally a second rectangle, the large sides of which each have a part 13 in the form of an arc of a circle which matches the cylindrical form of the brushes. The third straight section is a third rectangle with dimensions substantially equal to 1.8 mm×0.9 mm, and representing less than 3.5% of the second straight section.

Figure 3A:
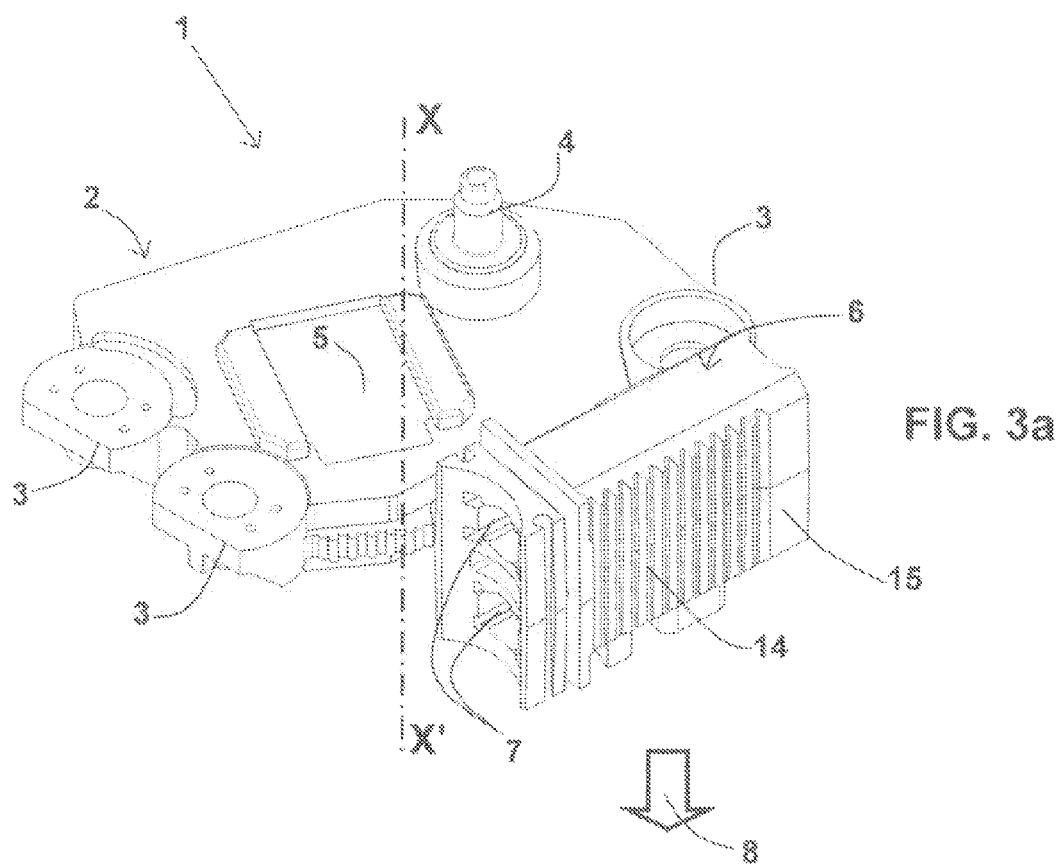
FIG. 3a is a view in perspective of the voltage regulator/brush-holder assembly in a single piece according to the invention.

In order to improve the cooling of the brush-holder 6 in the environment in which the temperature can reach 125° C., the body of the brush-holder 6 comprises cooling fins 14 on a longitudinal surface 15 provided in an axial direction XX', i.e. in the direction of the flow of air 8 aspirated by the fan, as shown clearly in FIG. 3a.

Figure 3B:
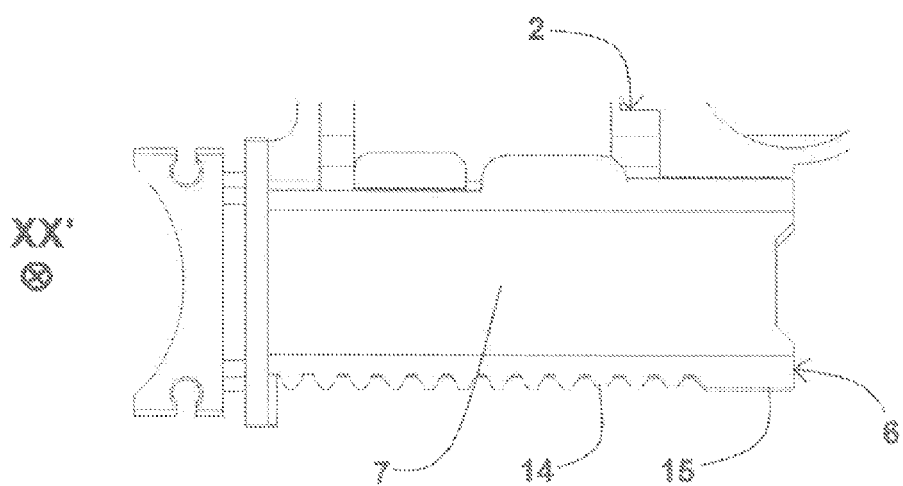
FIG. 3b is a partial view of the body of the brush-holder according to the invention, on a radial plane of a rotor of a rotary electrical machine for which it is destined.

The view in FIG. 3b of the body of the brush-holder 6 according to the invention shows a trapezoidal fin profile 14, but several other profiles are possible, in particular square or triangular. The best profile is the one which provides a large heat-exchange surface, whilst remaining simple to produce (ease of removal of the part from the mould).

These fins 14 are advantageously provided on the longitudinal surface 15 which is opposite the voltage regulator 5.

In this preferred embodiment of the invention, these fins 14, of which there are 12, have a longitudinal pitch which is substantially equal to 2 mm, and a height of approximately 0.9 mm.

It will be appreciated that the invention is not limited simply to the above-described preferred embodiment.

The numbers and dimensions of the grooves 9, 10, channels 11 and fins 14 indicated are simply examples. The essential design criteria of a voltage regulator/brush-holder assembly in a single piece 1 according to the invention are given in the form of dimensional ratios which make it possible to apply the invention to rotary electrical machines of all sizes.

The invention thus incorporates all the possible variant embodiments, within the limit of the subject of the following claims.

The invention claimed is:

1. A Voltage regulator/brush-holder assembly in a single piece (1) for an alternator or alternator-starter rotary electrical machine of a motor vehicle, said brush-holder (6) adapted to guide at least first and second brushes, in contact with two corresponding collector rings of a rotor of said machine, by means of respective first and second longitudinal receptacles (7) provided in the direction of said collector rings, in a substantially parallelepiped body (6) made of electrically insulating material which extends substantially on an axial plane of said rotor, each of said first and second receptacles (7) being provided with at least a respective first inner longitudinal groove (9) positioned alongside and parallel respectively to said first and second receptacles, and further in communication with at least one channel (11), which is provided in said body and extends in an axial direction (XX') of said rotor, and is designed to have a cooling fluid (8, 12) passing through it, wherein a first straight section of said first inner groove (9) has a cross sectional area of between 5% and 7% of a cross sectional area of a second straight section of said receptacles (7).

2. Voltage regulator/brush-holder assembly in a single piece (1) for a rotary electrical machine according to claim 1, characterized in that said first inner grooves corresponding respectively to the first and second longitudinal receptacles (7) have separate respective first straight sections.

3. Voltage regulator/brush-holder assembly in a single piece (1) for a rotary electrical machine according to claim 1, characterized in that each of said first and second receptacles (7) is also provided with at least a second inner longitudinal groove (10) which has a third straight section cross sectional area which is smaller than, or equal to, said cross sectional area of said first straight section.

4. Voltage regulator/brush-holder assembly in a single piece (1) for a rotary electrical machine according to claim 1, characterized in that said first straight section cross sectional shape is a first rectangle, with dimensions substantially equal to 2.0 mm×1.8 mm.

5. Voltage regulator/brush-holder assembly in a single piece (1) for a rotary electrical machine according to claim 1, characterized in that said second straight section is globally a second rectangle, the large sides of which each have an inner surface part (13) in the form of an arc of a circle.

6. Voltage regulator/brush-holder assembly in a single piece (1) for a rotary electrical machine according to claim 1, characterized in that said body (6) comprises cooling fins (14) parallel to said axial direction (XX') arranged on at least one longitudinal surface (15).

7. Voltage regulator/brush-holder assembly in a single piece (1) for a rotary electrical machine according to claim 6, characterized in that said fins (14) have a profile which is square or triangular or trapezoidal.

8. Voltage regulator/brush-holder assembly in a single piece (1) for a rotary electrical machine according to claim 6, characterized in that said fins (14) are provided on said longitudinal surface (15) which is opposite said voltage regulator (5).

9. Voltage regulator/brush-holder assembly in a single piece (1) for a rotary electrical machine according to claim 6, characterized in that said fins (14), of which there are 12, have a longitudinal pitch which is substantially equal to 2 mm, and a height of approximately 0.9 mm.

* * * * *